United States Patent
Nishikawa

(10) Patent No.: US 6,742,364 B2
(45) Date of Patent: Jun. 1, 2004

(54) METHOD OF MANUFACTURING MICRO GLASS OPTICAL ELEMENT

(75) Inventor: Shinichi Nishikawa, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 344 days.

(21) Appl. No.: 09/931,242

(22) Filed: Aug. 17, 2001

(65) Prior Publication Data
US 2002/0053223 A1 May 9, 2002

(30) Foreign Application Priority Data
Sep. 6, 2000 (JP) .......................... 2000-270068

(51) Int. Cl.⁷ .............................. C03B 19/10; G02B 3/00
(52) U.S. Cl. ........................... 65/377; 65/385; 65/21.3; 65/21.5; 65/126; 65/127; 65/29.15; 65/29.17
(58) Field of Search ...................... 65/385, 21.3, 21.5, 65/29.21, 126–127, 377, 29.15, 29.17

(56) References Cited

U.S. PATENT DOCUMENTS

| | | | | |
|---|---|---|---|---|
| 1,573,635 A | * | 2/1926 | Drey | 65/123 |
| 2,994,161 A | * | 8/1961 | Bair | 65/26 |
| 3,293,017 A | * | 12/1966 | Jenkins | 65/72 |
| 3,817,736 A | * | 6/1974 | Kojo et al. | 65/129 |
| 5,227,239 A | * | 7/1993 | Upadhye et al. | 428/402 |
| 5,240,488 A | * | 8/1993 | Chandross et al. | 65/395 |
| 5,626,641 A | | 5/1997 | Yonemoto et al. | |
| 5,709,723 A | | 1/1998 | Gearing | |
| 5,738,701 A | | 4/1998 | Ikeuchi et al. | |
| 6,230,520 B1 | * | 5/2001 | Hirota et al. | 65/25.1 |
| 6,477,862 B1 | * | 11/2002 | Wacke | 65/29.14 |
| 2002/0053223 A1 | * | 5/2002 | Nishikawa | 65/377 |
| 2003/0014999 A1 | * | 1/2003 | Koerner et al. | 65/127 |
| 2003/0131628 A1 | * | 7/2003 | Murakami et al. | 65/21.2 |
| 2003/0145627 A1 | * | 8/2003 | Beck et al. | 65/304 |
| 2003/0151650 A1 | * | 8/2003 | Masuda et al. | 347/96 |

FOREIGN PATENT DOCUMENTS

| | | | | |
|---|---|---|---|---|
| DE | 3924238 A1 | * | 1/1990 | C03B/19/02 |
| DE | 4116593 C1 | * | 1/1993 | C03B/7/16 |
| EP | 408065 A2 | * | 1/1991 | C03B/11/08 |
| JP | 62292635 A | * | 12/1987 | C03B/11/00 |
| JP | 06206730 A | * | 7/1994 | C03B/7/08 |
| JP | 2002154834 A | * | 5/2002 | C03B/19/10 |

* cited by examiner

Primary Examiner—José A. Fortuna
(74) Attorney, Agent, or Firm—Burns, Doane, Swecker & Mathis, LLP

(57) ABSTRACT

A method of manufacturing a micro molten glass droplet, has the steps of, colliding a molten glass droplet with a micro through hole formed in a plate-shaped member; and pushing out at least part of the glass droplet to a reverse surface of the micro through hole as a micro droplet, thereby forming a glass droplet with a diameter of not more than 5 mm.

7 Claims, 5 Drawing Sheets

METHOD OF MANUFACTURING MICRO GLASS OPTICAL ELEMENT

RELATED APPLICATION

This application is based on application No. 2000-270068 filed in Japan, the content of which is hereby incorporated by reference.

FIELD OF THE INVENTION

The present invention relates to a method of manufacturing a micro glass optical element such as a collimator lens for optical communication, an optical pickup lens and an endoscope lens and a micro glass droplet for manufacturing a micro glass optical element, and a micro glass optical element and a glass material for molding obtained by the method.

DESCRIPTION OF THE PRIOR ART

Micro glass optical elements used to be manufactured by grinding. However, since this method is inferior in productivity, the following methods have been used in recent years:

(A) Method of heating a glass material having an approximate shape, and pressing it with a mold;

(B) Method of dropping a molten glass droplet onto a heated mold, and pressing it; and (C) Method of solidifying a molten glass droplet by cooling, thereby manufacturing a spherical lens.

However, in manufacturing a micro optical element with a diameter of, for example, approximately φ0.5 to φ3 mm, these methods present the following problems:

In the case of the method (A), it is necessary to prepare a micro glass material for molding having a corresponding volume, and since it is difficult to process such a micro glass material, cost increases. Another method for obtaining a micro glass material is machining glass material molded so as to have a larger volume, into a micro glass material. In this method, cost also increases because the number of manufacturing steps increases.

In the case of the method (B), it is difficult to obtain a micro molten glass droplet with a diameter of not more than φ3 mm for the following reason: Normally, the weight of a glass droplet dropped from a nozzle is represented by the following expression:

$$mg = 2\pi r Y \quad (1)$$

Here, m is the mass of the glass droplet;
g is the acceleration of gravity;
r is one-half the outside diameter of the nozzle tip; and
Y is the surface tension of the glass droplet.

According to the expression (1), the weight of the glass droplet can be reduced by reducing the outside diameter of the nozzle tip. In actuality, however, 1) since it is necessary for the nozzle to have a predetermined inside diameter in order for molten glass to flow through the nozzle, the reduction in the outside diameter is limited, and 2) since molten glass wets and spreads at the nozzle tip to increase the apparent outside diameter of the nozzle tip, the reduction in the outside diameter produces no effect. Thus, in actuality, it is difficult to obtain a molten glass droplet having a size of a certain degree or smaller, and the lower limit of the diameter of the molten glass droplet is φ3 mm.

In the case of the method (C), like in the case of the method (B), it is difficult to obtain a micro glass droplet with a diameter of not more than φ3 mm.

A glass droplet with a diameter of not less than approximately φ3 mm can be obtained by dropping molten glass from a nozzle as usually performed. However, in that case, to adjust the weight of the glass droplet, it is normally necessary to change the outside diameter and the shape of the nozzle, so that the rate of operation of the production facilities decreases. This is a big factor of cost increase.

SUMMARY OF THE INVENTION

An object of the present invention is to provide an improved method for obtaining a micro glass droplet by solving the problems of the methods (A) to (C).

An object of the present invention is, particularly, to provide a method for obtaining a micro glass droplet with a diameter of not more than φ3 mm.

Another object of the present invention is to provide a method for adjusting the size of the glass droplet easily and precisely without changing the nozzle.

The present invention relates to a method of manufacturing a micro molten glass droplet with a diameter of not more than 5 mm, characterized in that by colliding a molten glass droplet with a micro through hole formed in a plate-shaped member, at least part of the glass droplet is pushed out to the reverse surface of the micro through hole as a micro droplet.

Particularly, the present invention relates to the above-described manufacturing method wherein the collision of the molten glass droplet is by a free fall of the molten glass droplet dropped from a nozzle.

Moreover, the present invention relates to a method of manufacturing a micro spherical lens or a micro spherical material for pressing, wherein a micro molten glass droplet obtained by any of the above-described methods is solidified by cooling.

Further, the present invention relates to a micro optical element manufactured by dropping a micro molten glass droplet obtained by any of the above-described methods onto a mold and molding it, or to a glass material for pressing manufactured by dropping a micro molten glass droplet obtained by any of the above-described methods onto a mold and preliminarily molding it.

Further, the present invention relates to a method of adjusting the weight of a micro molten glass droplet in any of the above-described methods of manufacturing a micro molten glass droplet, wherein the adjustment is made by adjusting any or all of the diameter of the micro through hole, the distance from the nozzle to the micro through hole and the temperature of the molten glass.

In addition, the present invention relates to an apparatus for manufacturing a micro molten glass droplet with a diameter of not more than 5 mm, including a nozzle, and a plate-shaped member placed below the nozzle and having a micro through hole for further dropping at least part of a molten glass droplet dropped from a nozzle.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1A:
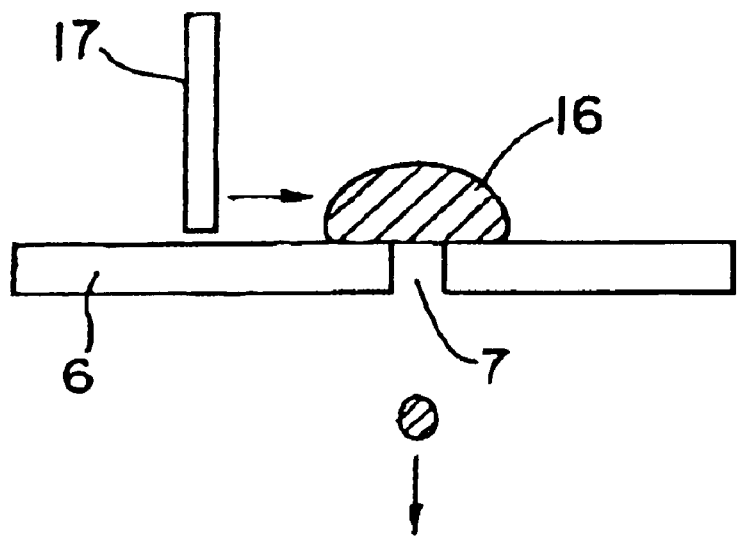
FIGS. 1(a) and 1(b) are schematic views showing a method of removing excessive glass (in a case where the diameter of a micro hole is small), FIG. 1(a) showing a condition before the excessive glass is removed and FIG. 1(b) showing a condition while the excessive glass is being removed.

This embodiment provides a method of manufacturing a micro molten glass droplet with a diameter of not more than 5 mm, particularly, 0.5 to 3 mm, and is a technology to collide a molten glass droplet with a micro through hole having a smaller diameter to thereby form a micro molten glass droplet on the reverse surface of the micro through hole.

The size of the micro molten glass droplet obtained through the micro through hole is a function of the kind of the glass and the temperature of the molten glass passing through the micro hole which kind and temperature decide the viscosity and the surface tension of the glass, the speed of the molten glass colliding with the micro hole, the diameter (D) of the micro hole, the length (L) of the micro hole, L/D of the micro hole, the shape of the micro hole, the shapes of the edges of the entrance and the exit of the micro hole, the smoothness of the inner surface of the micro hole, the material of a plate-shaped member on which the thermal capacity of the plate-shaped member and wetting of the glass to the inner surface of the micro hole are dependent, and the like, and by selecting these conditions, a necessary adjustment of the size of the micro molten glass droplet can be made. The present invention has found that, by appropriately selecting, of these factors, the diameter of the micro through hole, the temperature of the molten glass passing through the micro hole and the speed of the molten glass colliding with the micro hole, a micro molten glass droplet of a target size can be obtained.

The diameter of the micro through hole is selected according to the target micro molten glass droplet diameter. It is normally 0.7 to 1 time the target micro molten glass droplet diameter.

The temperature of the molten glass passing through the micro hole is not specifically limited as long as it is a temperature at which the viscosity is low enough for the micro droplet to be separated when colliding with the plate-shaped member. However, normally, it is desirable that the temperature be within a range where excellent internal quality is obtained.

It is necessary for the molten glass collided with the micro through hole only to be a molten glass droplet having a larger diameter than the micro hole. However, since the weights of the obtained micro glass droplets tend to vary largely when the weight ratio to the desired micro glass droplet is low, it is desirable that the weight of the molten glass collided with the plate-shaped member be two or more times the weight of the desired micro glass droplet.

The method for supplying the molten glass droplet is not specifically limited. The molten glass droplet may be supplied by any method. For example, the following method may be used: Molten glass is dropped by gravitation from a nozzle provided at a lower part of a molten glass reservoir, and is collided with the plate-shaped member having a micro through hole which member is placed below the nozzle. Therefore, in this case, the speed of collision depends on the distance H between the lower end of the nozzle and the micro through hole. In the case of the present invention, the distance H is generally 10 to 5000 mm, preferably, 50 to 2000 mm.

After a micro glass droplet is dropped from the micro through hole, the excessive glass remaining on the plate-shaped member can be removed easily by the procedure shown below. Therefore, micro glass droplets can be obtained continuously without the need to change the plate-shaped member having the micro through hole each time.

Figure 1B:
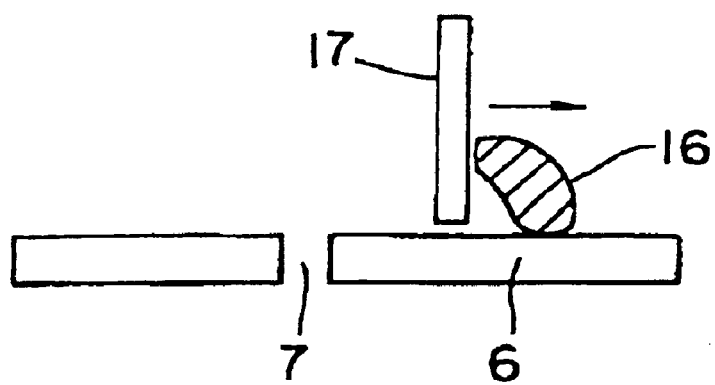

When the diameter of the micro hole is comparatively small (for example, not more than φ1.8 mm) and the excessive glass remaining on the plate-shaped member does not enter the micro hole due to the surface tension of the glass, the excessive glass can be removed easily by scraping it off with a metal spatula as shown in FIG. 1, or by absorbing it or pinching it off.

Figure 2A:
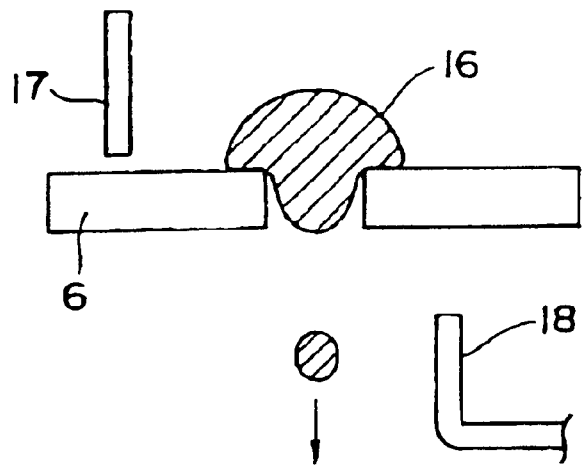
FIGS. 2(a) and 2(b) are schematic views showing a method of removing the excessive glass (in a case where the diameter of the micro hole is large), FIG. 2(a) showing a condition before the excessive glass is removed and FIG. 2(b) showing a condition while the excessive glass is being removed.
Figure 2B:
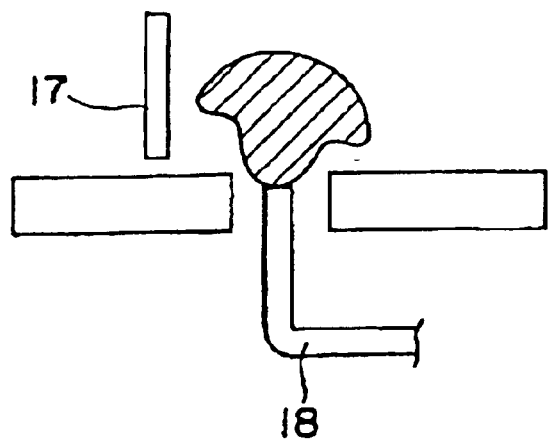

When the diameter of the micro hole is comparatively large (for example, not less than φ2.2 mm), the excessive glass remaining on the plate-shaped member enters the micro hole. In this case, the excessive glass can be removed easily by pushing it up from below with a pin-shaped member as shown in FIG. 2 or by pushing it up with a pin-shaped member and then, scraping it off with a metal spatula.

Figure 3:
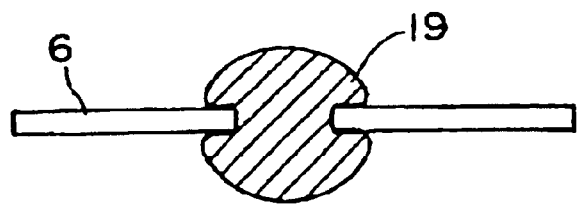
FIG. 3 is a schematic view showing a problem that arises in a case where a plate-shaped member having the micro hole is too thin.

In this case, if the plate-shaped member having the micro hole is too thin, the glass entering the micro hole spreads from the micro hole around the micro hole on the lower surface of the plate-shaped member as shown in FIG. 3, so that it is difficult to remove the excessive glass. Therefore, it is desirable for the plate-shaped member to have a thickness such that the glass entering the micro hole does not reach the lower surface.

Figure 4:
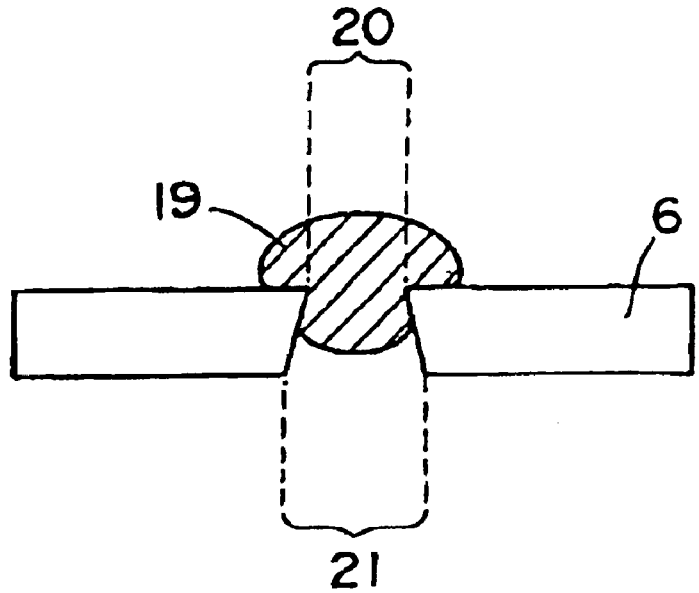
FIG. 4 is a schematic view showing a problem that arises in a case where the shape of the micro hole is inappropriate.

When the diameter of the micro hole is larger at the lower surface of the plate-shaped member than at the upper surface thereof as shown in FIG. 4, removal of the excessive glass is also difficult. Therefore, it is desirable for the diameter of the micro hole to be the same throughout the hole or to be larger at the upper surface than at the lower surface. While a material such as ceramic can be used, a material is desirable that is high in heat resistance and with which the periphery of the micro through hole does not deteriorate due to oxidation or the like.

Even when the micro through hole is not circular in cross section, a spherical micro molten glass droplet is normally obtained because of the surface tension. However, in view of elimination of dead space in the micro hole, it is desirable that the micro through hole be circular in cross section.

When the molten glass droplet collided with the micro through hole is supplied from a nozzle, for example the following method can be used: The nozzle is attached to a lower end of a molten glass reservoir like a melting pot, and after a droplet is formed at the tip of the nozzle, the molten glass is dropped from the nozzle by the gravitation.

By use of micro molten glass droplets manufactured by the above-described method, micro glass materials such as a micro spherical lens, a glass material for pressing and a micro optical element can be manufactured by the following method. A micro spherical lens or a glass material for pressing can be manufactured by solidifying a micro molten glass droplet by cooling, or by further performing finishing processing such as polishing on the solidified glass droplet. Alternately, a micro optical element or a glass material for pressing can be manufactured by dropping a micro molten glass droplet onto a mold in a molten state and molding it.

Hereinafter, the present invention will be described in detail and concretely with embodiments.

First Embodiment

Figure 5:
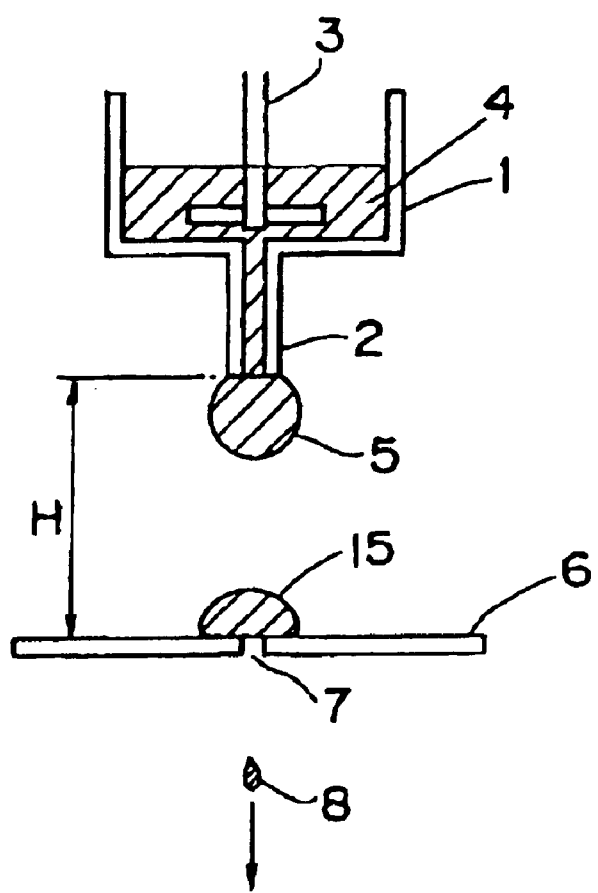
FIG. 5 is a schematic view showing an example of a method of manufacturing a micro molten glass droplet (first embodiment)

Referring to FIG. 5, reference number 1 represents a glass melting pot, and reference number 2 represents a nozzle for dropping glass droplets. The melting pot 1 is heated to 1000° C. by non-illustrated heating means. Molten glass 4 (material property SF57) in the melting pot 1 is stirred by a stirring bar 3. When the nozzle 2 is heated to 1100° C. by the non-illustrated heating means, a glass droplet 5 is formed at the tip of the nozzle 2. When the weight of the glass droplet 5 becomes a predetermined value or heavier, the glass droplet 5 is separated from the nozzle to be dropped.

As mentioned above, the weight of the glass droplet 5 is represented, theoretically, by the expression (1), and depends mainly on the outside diameter of the nozzle 2. In an experiment, when the nozzle outside diameter was 4 mm (the nozzle inside diameter was 0.8 mm), a molten glass droplet of approximately 200 mg (4 mm in diameter) was obtained, and when the outside diameter was 1 mm (the inside diameter was 0.5 mm), a molten glass droplet of approximately 70 mg (3 mm in diameter) was obtained. However, to further reduce the nozzle outside diameter, it is necessary to further reduce the nozzle inside diameter and molten glass does not flow through the nozzle unless a high pressure is applied, so that the molten glass droplet cannot be dropped excellently. Therefore, in the case of this glass, it is extremely difficult to drop a glass droplet with a weight of not more than 70 mg.

A stainless steel plate (droplet weight control plate 6) with a thickness of 1.5 mm having a circular micro through hole 7 with a diameter of 2 mm was placed horizontally at 100 mm below the nozzle, and a glass droplet 5 of 195 mg was dropped from the nozzle (the outside diameter 4 mm□) onto the micro through hole. Part of the molten glass droplet passed through the micro through hole 7 by the kinetic energy obtained by the dropping to become a micro glass droplet 8, which dropped to the reverse surface of the micro through hole. The micro molten glass droplet 8 was approximately 35 mg in weight (2.3 mm in diameter), and a micro glass droplet that cannot be obtained by only dropping from the nozzle was obtained. Since the glass 15 of approximately 160 mg remaining on the control plate 6 could be removed by absorption or by scraping it with a metal spatula, micro glass droplets could be obtained continuously.

The sizes of the micro glass droplets obtained when the diameter D of the micro through hole and the distance H from the control plate (thin plate) to the nozzle tip were varied as shown in Table 1 in the above are shown in Table 1. Here, the glass kind is SF57.

TABLE 1

| | | DIAMETER D OF MICRO THROUGH HOLE | | |
|---|---|---|---|---|
| | | 2.0 | 1.8 | 1.6 |
| Distance H | 100 mm | 35 mg | Not dropped | Not dropped |
| | 150 mm | 42 mg | 20 mg | 12 mg |
| | 200 mm | 22 mg | 22 mg | 16 mg |

Generally, the smaller the distance H is, the lighter the micro glass droplet is. However, when the distance H is smaller than a predetermined limit, the molten glass does not pass through the micro through hole, so that no micro glass droplet is formed. By appropriately selecting the diameter D of the micro hole and the distance H, a target micro glass droplet can be obtained.

Variations in the sizes of the micro glass droplets obtained when the temperature of the nozzle was varied while the diameter D of the micro through hole was fixed to 1.6 mm and the distance H from the control plate (thin plate) to the nozzle tip was fixed to 200 mm are shown in Table 2. Here, the glass kind is SF57.

TABLE 2

| Temperature of nozzle | 950 | 960 | 980 | 1000 | 1050 |
|---|---|---|---|---|---|
| Weight of micro glass droplet | Failure | 14 mg | 16 mg | 18 mg | 21 mg |
| Diameter of micro through hole: | 1.6 mm | | | | |
| Distance: | 200 mm | | | | |

The lower the temperatur of the nozzle is, that is, the higher the viscosity of the molten glass is, the lighter the micro glass droplet is. However, when the viscosity exceeds a predetermined level, the molten glass does not pass through the micro through hole, so that no micro glass droplet is formed. A target micro glass droplet can be obtained also by appropriately selecting the temperature of the nozzle, that is, the temperature of the molten glass.

Second Embodiment

Figure 6:
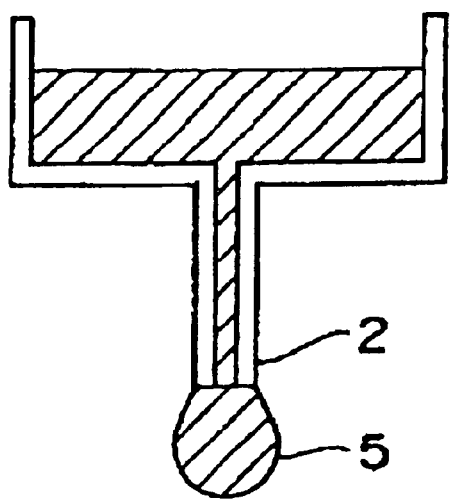
FIG. 6 is a schematic view showing another example of a method of manufacturing a micro molten glass droplet and manufacturing a micro lens from the micro molten glass droplet (second embodiment)
Figure 6:
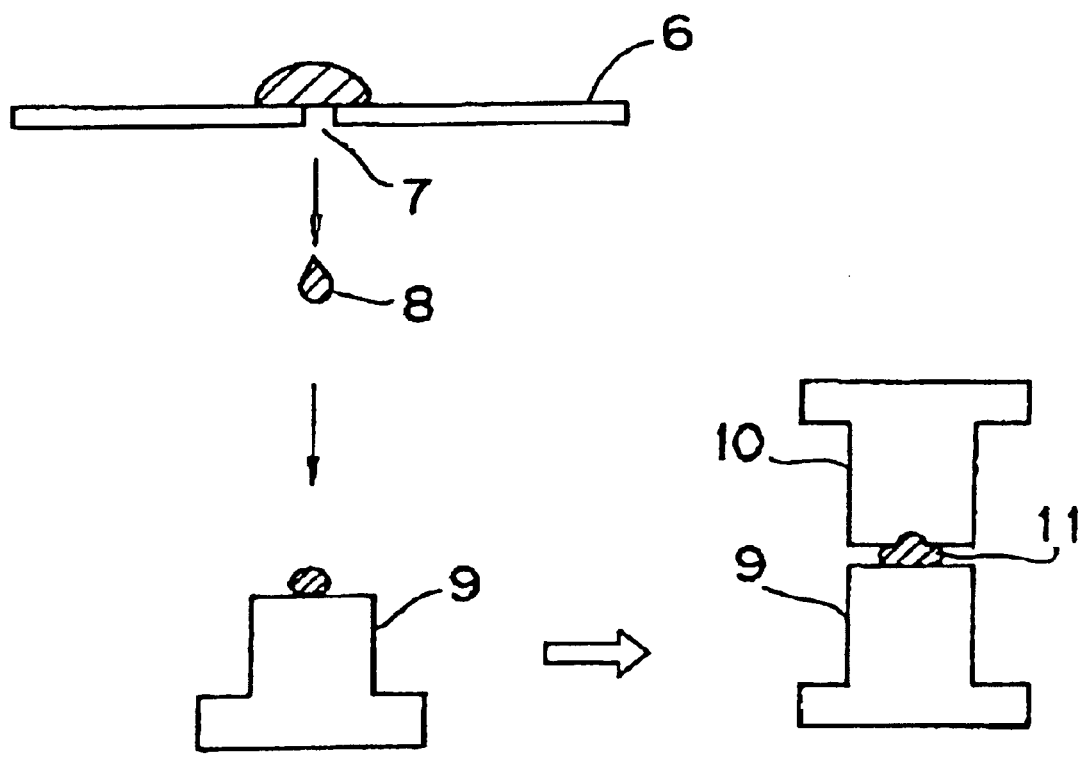

A method of forming a micro molten glass droplet and molding a micro lens therefrom will be described with reference to FIG. 6. Like the first embodiment, a molten glass droplet (SF57) 5 of approximately 200 mg was dropped from the tip of a nozzle 2 with an outside diameter of 4 mm onto a control plate 6 having a micro through hole 7 with a diameter D of 2 mm, so that a micro molten glass droplet of approximately 35 mg was dropped from the reverse surface of the micro through hole. After the micro molten glass droplet 8 was dropped onto a flat mold 9 heated to 400° C., the mold 9 was moved to below an upper mold 10 also heated to 400° C. and on which a spherical concave with a radius of 1.5 mm was formed by precision grinding, and a lens 11 was pressure-molded by the upper mold 10 and the lower mold 9.

To both surfaces of the obtained molded lens 2, the shapes of the molds were precisely transferred. Thus, a micro lens with a weight of 35 mg which had been difficult to obtain was obtained.

Third Embodiment

Figure 7:
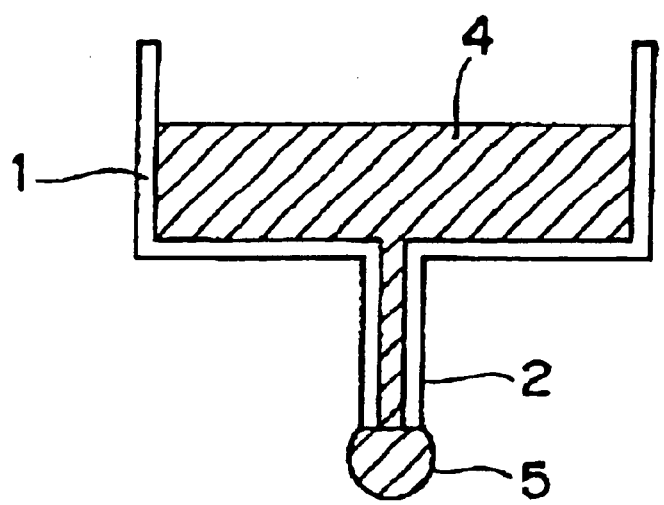
FIG. 7 is a schematic view showing still another example of a method of manufacturing a micro molten glass droplet and manufacturing a micro glass material for pressing from the micro molten glass droplet (third embodiment)

As shown in FIG. 7, molten glass 4 (SK5) in a melting pot 1 was dropped as a molten droplet of approximately 200 mg from a nozzle with an outside diameter of 4 mm onto a micro through hole 7 with a diameter D of 1.6 mm provided in a control thin plate 6. The molten glass was dropped from the reverse surface of the micro through hole as a molten micro glass droplet 8 with a size of approximately 10 mg. The micro glass droplet 8 was ensphered by the surface tension and solidified by being cooled while dropping, and was collected as a micro spherical lens 13 of 10 mg in a saucer 12 placed sufficiently below.

The micro spherical lens can be used as a material for molding for obtaining micro optical elements of various shapes by being further pressure-molded.

Figure 8:
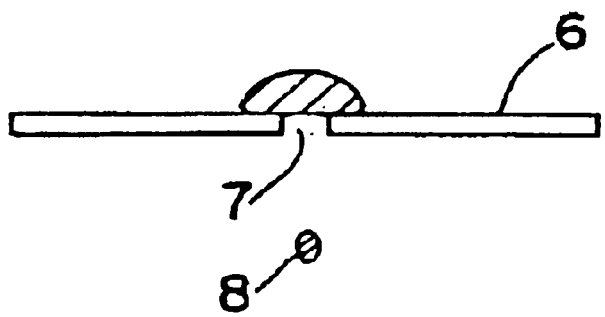
FIG. 8 is a schematic view showing another type of saucer for the micro molten glass droplet in the method of the third embodiment.
Figure 8:
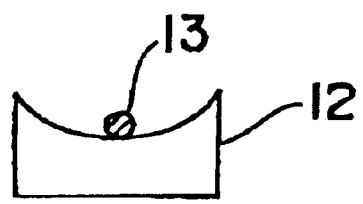
Figure 8:
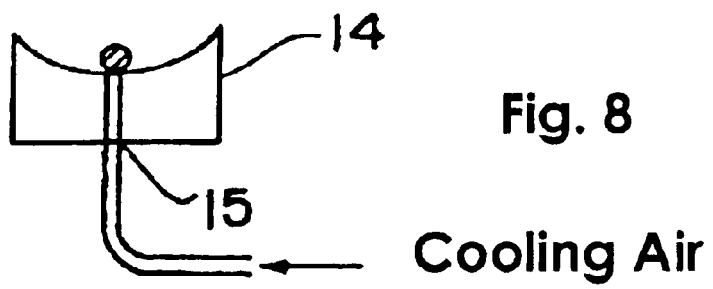

The micro glass droplet 8 may be solidified instead of by cooling by itself while dropping but by being cooled in the following manner: The micro glass droplet 8 is received in a saucer 14 having an air vent 15 formed in its center as shown in FIG. 8, and cooling air is flown through the air vent to roll the micro glass droplet 8 on the saucer or to float it, thereby cooling the micro glass droplet 8.

The saucer 14 may be made of a porous material such as porous carbon or porous ceramic so that air is flown out from the entire surface of the saucer to cool the micro glass droplet 8.

As described above, according to the method of the present invention, a micro glass droplet with a diameter of not more than 5 mm that cannot be obtained by dropping molten glass directly from the nozzle can be obtained.

Moreover, by solidifying the obtained micro gloss droplet by cooling, a micro glass lens and a micro glass material for pressing can be manufactured. Moreover, by dropping the obtained micro glass droplet onto a mold and pressing it, a micro optical element and a micro glass material for pressing can be manufactured.

Further, according to the method of the present invention, by adjusting any or all of the diameter of the micro through hole, the distance from the nozzle to the micro hole and the temperature of the molten glass, the size of the micro glass droplet can be adjusted without the apparatus being stopped for a long time for changing the nozzle.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method of manufacturing a micro molten glass droplet, comprising the steps of:
   colliding a molten glass droplet with a micro through hole formed in a plate-shaped member; and
   pushing out at least part of the glass droplet to a reverse surface of the micro through hole as a micro droplet, thereby forming a glass droplet with a diameter of not more than 5 mm.

2. A manufacturing method as claimed in claim 1, wherein said collision of the molten glass droplet is by a free fall of the molten glass droplet dropped from a nozzle.

3. A method of manufacturing a micro optical element, comprising the steps of:
   colliding a molten glass droplet with a micro through hole formed in a plate-shaped member;
   pushing out at least part of the glass droplet to a reverse surface of the micro through hole as a micro droplet, thereby forming a glass droplet with a diameter of not more than 5 mm; and
   solidifying the obtained glass droplet by cooling, thereby obtaining a micro optical element.

4. A manufacturing method as claimed in claim 3, wherein said micro optical element is a micro spherical lens.

5. A method of manufacturing a micro optical element, comprising the steps of:
   colliding a molten glass droplet with a micro through hole formed in a plate-shaped member;
   pushing out at least part of the glass droplet to a reverse surface of the micro through hole as a micro droplet, thereby forming a glass droplet with a diameter of not more than 5 mm;
   solidifying the obtained glass droplet by cooling, thereby obtaining a material for pressing; and
   re-heating the material for pressing, and pressing said material with a mold, thereby obtaining a micro optical element.

6. A manufacturing method as claimed in claim 5, wherein said micro optical element is a micro spherical lens.

7. A method of manufacturing a micro molten glass droplet, comprising the steps of:
   colliding a molten glass droplet freely dropped from a nozzle, with a micro through hole formed in a plate-shaped member; and
   by adjusting any or all of a diameter of the micro through hole, a distance from the nozzle to the micro through hole and a temperature of molten glass, pushing out at least part of the glass droplet to a reverse surface of the micro through hole as a micro droplet, thereby forming a glass droplet with a diameter of not more than 5 mm.

* * * * *